United States Patent [19]
Shinomiya

[11] Patent Number: 5,920,707
[45] Date of Patent: Jul. 6, 1999

[54] BUS CONTROLLER AND METHOD THEREFOR FOR SUPPORTING A LIVE-LINE INSERTION/DISCONNECTION IN A SYNCHRONOUS BUS

[75] Inventor: Kiyoshi Shinomiya, Yamanashi, Japan

[73] Assignee: NEC Corporation, Tokyo, Japan

[21] Appl. No.: 08/768,133

[22] Filed: Dec. 17, 1996

[30] Foreign Application Priority Data

Jan. 29, 1996 [JP] Japan .................................. 8-012884

[51] Int. Cl.⁶ .................................................. G06F 13/14
[52] U.S. Cl. .......................................... 395/287; 395/728
[58] Field of Search .................................. 395/283, 282, 395/287, 726–732, 288–305

[56] References Cited

U.S. PATENT DOCUMENTS

| | | | |
|---|---|---|---|
| 4,814,974 | 3/1989 | Naayanan et al. | 395/732 |
| 4,999,787 | 3/1991 | McNally et al. | 395/283 |
| 5,157,771 | 10/1992 | Losi et al. | 395/283 |
| 5,202,965 | 4/1993 | Ahn et al. | |
| 5,237,686 | 8/1993 | Asano et al. | 395/675 |
| 5,310,998 | 5/1994 | Okuno | 235/380 |
| 5,378,930 | 1/1995 | Kuchenreuther | |
| 5,386,567 | 1/1995 | Lien et al. | 395/653 |
| 5,473,499 | 12/1995 | Weir | 361/58 |
| 5,581,712 | 12/1996 | Herrman | 395/283 |
| 5,598,539 | 1/1997 | Gephardt et al. | 395/281 |
| 5,625,238 | 4/1997 | Ady et al. | 395/283 |
| 5,632,020 | 5/1997 | Gephardt et al. | 395/283 |

FOREIGN PATENT DOCUMENTS

| | | |
|---|---|---|
| 0559 454 A1 | 9/1993 | European Pat. Off. |
| 0373043 | 6/1990 | France |
| 58-219627 | 12/1983 | Japan |
| 61-259357 | 11/1986 | Japan |
| 1-196616 | 8/1989 | Japan |
| 6-332848 | 12/1994 | Japan |
| 7-44293 | 2/1995 | Japan |

OTHER PUBLICATIONS

French Search Report, dated Apr. 3, 1998.
Japanese Office Action dated Aug. 4, 1998, with partial translation.

*Primary Examiner*—Ayaz R. Sheikh
*Assistant Examiner*—Paul R. Myers
*Attorney, Agent, or Firm*—McGinn & Gibb, P.C.

[57] ABSTRACT

In a computer system, a device is inserted to and disconnected from a synchronous bus without stopping the entire system. A timing generator generates timing to issue a bus termination/start command. A bus control table manage correspondence between the requests and the replies. For logical termination, the timing generator waits until the bus control table becomes empty. A bus arbitor has an arbitration pointer which stores the highest priority. A bus operation controller clears the arbitration pointer when the insertion or disconnection occurs.

5 Claims, 9 Drawing Sheets

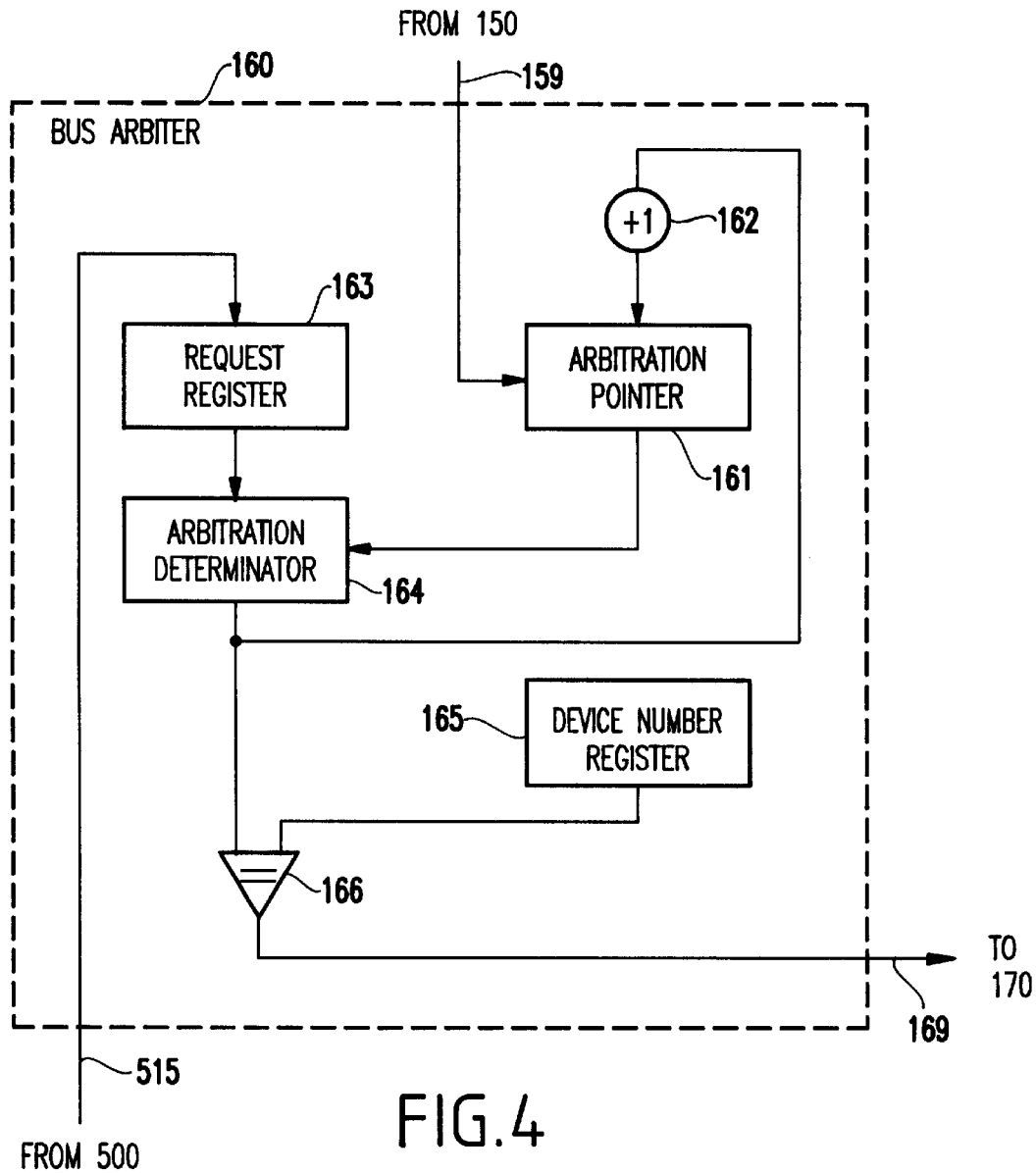

BUS CONTROLLER AND METHOD THEREFOR FOR SUPPORTING A LIVE-LINE INSERTION/DISCONNECTION IN A SYNCHRONOUS BUS

BACKGROUND OF THE INVENTION

The present invention relates to a bus controller, and more particularly to a bus controller which terminates and restarts a bus without stopping the entire system.

In a conventional bus controller for an asynchronous bus, occurrence of noise or bus-fight on an asynchronous bus is predicted to generate an insertion/disconnection signal while the noise or bus-fight occurs. By receiving the insertion/disconnection signal, the asynchronous bus is temporally terminated. Thereby, a device can be inserted to and disconnected from the bus without stopping the entire system. That is called a "live-line insertion and disconnection".

In an asynchronous bus, a data available signal is utilized for ensuring timing. When a bus controller generates an insertion/disconnection signal, the data available signal is inactivated.

However, in a synchronous bus, timing of available data is predetermined. If a noise or bus-fight occurs during the predetermined timing, data on the synchronous bus may contain improper data.

Moreover, for a bus performing distributed arbitration, it is necessary to match arbitration pointers for all devices when a new device is inserted to the bus. However, since the arbitration pointers are not matched by the insertion/disconnection signal, it is necessary to match the arbitration pointers by a diagnostic device at timing of restarting.

Furthermore, in a split transaction bus system in which data read operation is divided into two bus transactions of request and response, since correspondence between the request and the response is performed by respective bus controllers, a newly inserted bus controller cannot manage the correspondence if the newly inserted bus controller is inserted before the response is received.

SUMMARY OF THE INVENTION

In view of the foregoing problem of the conventional system, an object of the present invention is to provide a bus controller which supports a live-line insertion and disconnection in a synchronous bus.

In a bus controller according to a first aspect of the present invention, a timing generator generates a timing of a bus termination command and a bus restart command to be issued to a bus. A bus operation controller controls an operation of the bus based on one of the bus termination command and the bus restart command issued by said timing generator.

With the unique and unobvious structure of the present invention, a device can be inserted to and disconnected from the synchronous bus without stopping the entire system.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 4 is a block diagram showing the configuration of a bus arbitor 160 in the bus controller;

FIG. 5 shows the configuration of a bus control table 140 in the bus controller;

DETAILED DESCRIPTION OF THE PREFERRED EMBODIMENTS

A bus controller in accordance with a preferred embodiment of the present invention will be described in detail with reference to the accompanying drawings.

Figure 1:
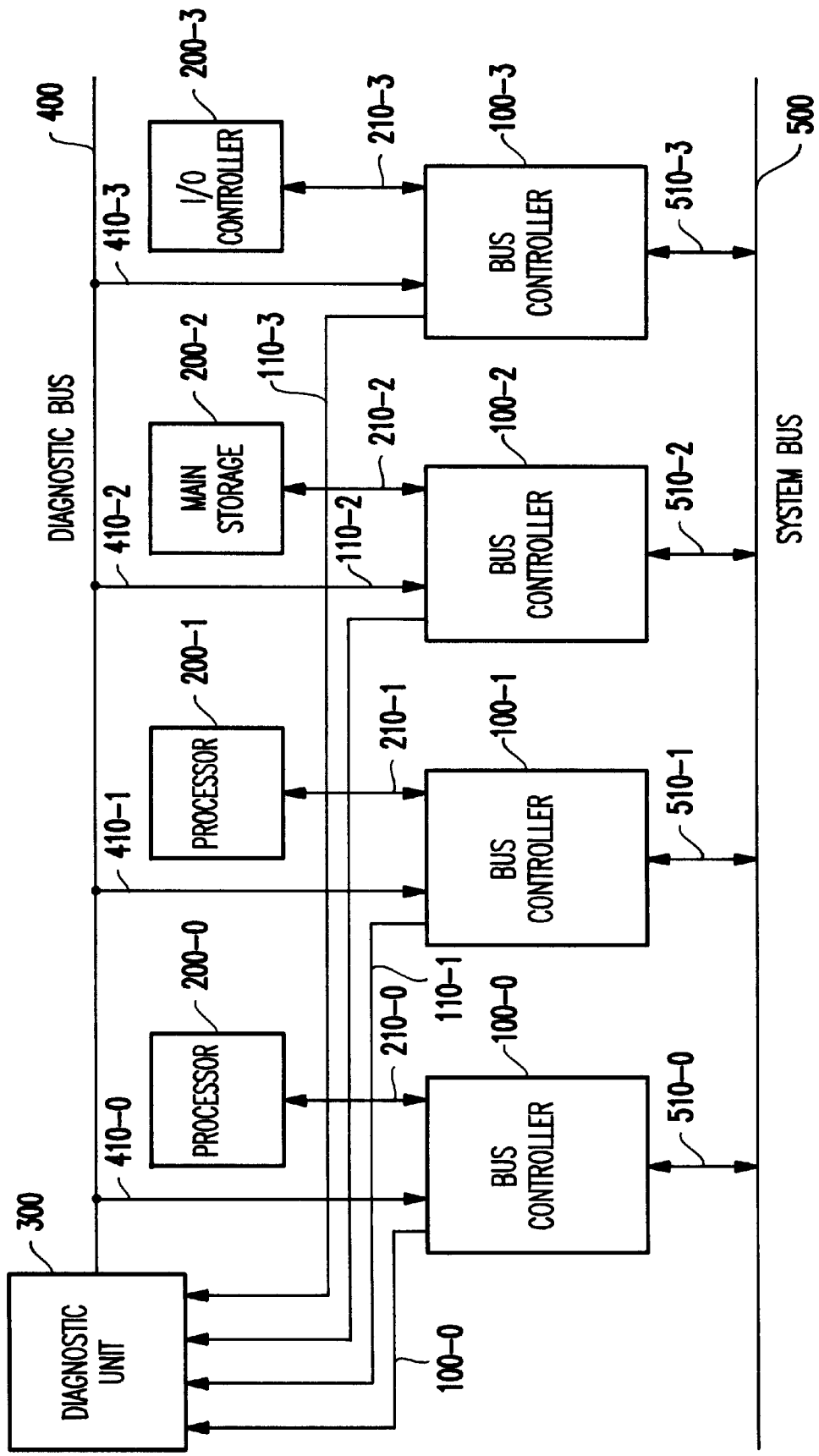
FIG. 1 is a block diagram showing the configuration of a computer system for applying the present invention.

Referring to FIG. 1, a computer system has bus controllers 100 (e.g., 100-0, 100-1, 100-2, and 100-3), devices 200 (e.g., processors 200-0 and 200-1, a main storage 200-2, and an I/O controller 200-3) which respectively connect the bus controllers 100 via signal lines 210 (e.g., 210-0, 210-1, 210-2, and 210-3), a system bus 500 which connects bus controllers 100, a diagnostic unit 300, and a diagnostic bus 400.

The diagnostic unit 300 receives a detection signal of insertion/disconnection from bus controllers 100 via signal lines 110 (e.g., 110-0, 110-1, 110-2, and 110-3), and indicates bus termination/restart via the diagnostic bus 400.

Figure 2:
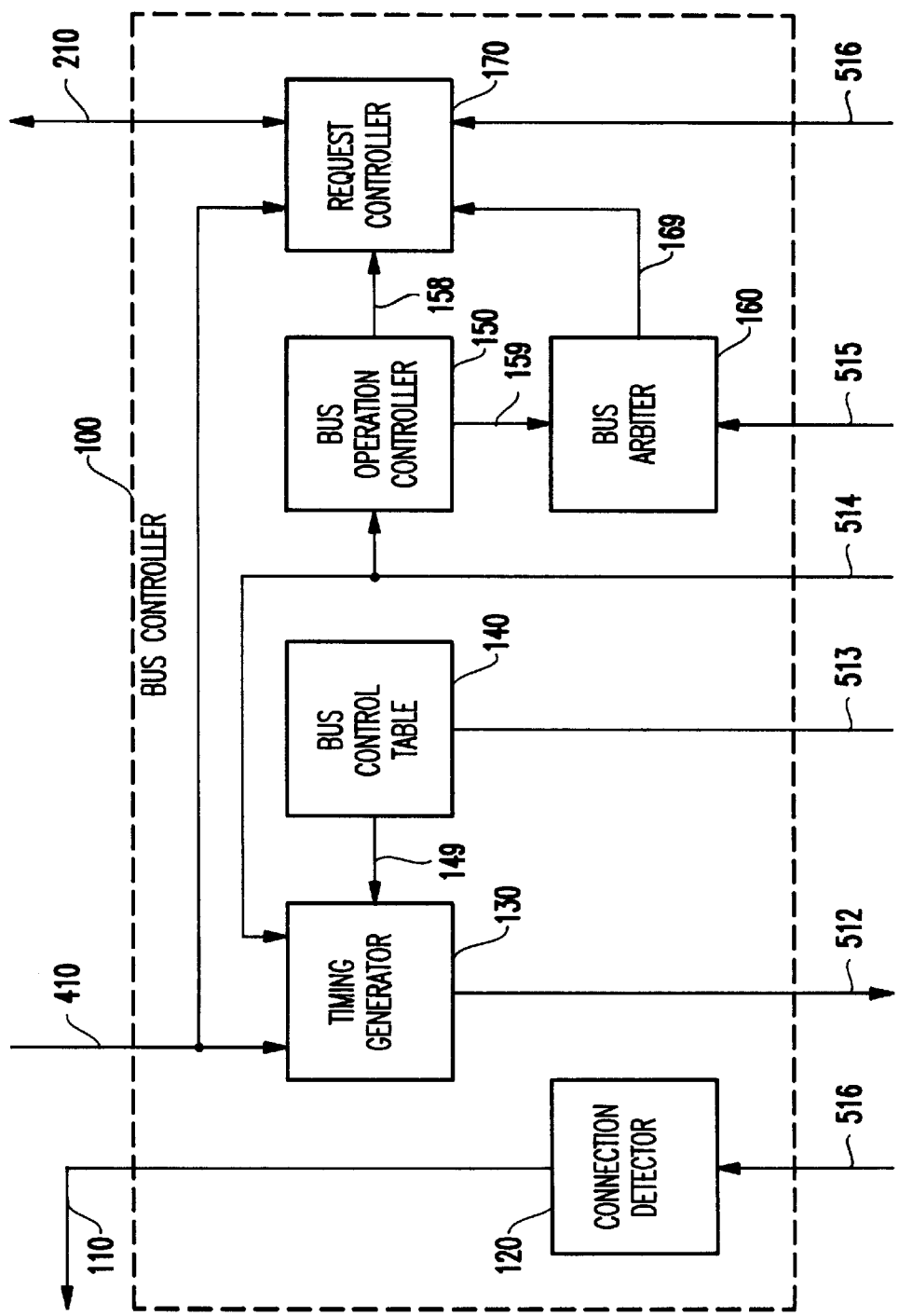
FIG. 2 is a block diagram showing the configuration of a bus controller according to an embodiment of the present invention.

Referring to FIG. 2, the bus controller 100 has a connection detector 120, a timing generator 130, a bus control table 140, a bus operation controller 150, a bus arbitor 160, and a request controller 170.

The connection detector 120 detects whether a device is inserted to or disconnected from the system bus 500. The detection is informed for the diagnostic unit 300.

The timing generator 130 generates a timing of a bus termination command and a bus restart command to be issued to the system bus 500 via a signal line 512 according to a bus termination signal 410 from the diagnostic unit 300 via the diagnostic bus 400.

The bus control table 140 manages correspondence between requests and-replies on the system bus 500. By information from the bus control table 140, the timing generator 130 determines whether on-going (unreplied) requests remain (unsolved).

The bus operation controller 150 receives bus status information via a signal line 514. If the bus status information indicates a bus termination, then the bus operation controller 150 sends a bus operation disable signal to the request controller 170, and an arbitration pointer clear signal 159 to the bus arbitor 160.

The bus arbitor 160 arbitrates bus contentions upon reception of a bus request from a signal line 515. The result of the arbitration is sent to the request controller 170 via signal line 169.

The request controller 170 controls requests and replies between a device 210 and the system bus 500. If the request controller 170 does not receive the bus operation disable signal, then the arbitration result via the signal line 169 is utilized.

There are two methods for terminating the system bus 500. First one is called "physical termination" to avoid being affected with noise which is generated when a device is physically connected to the system bus 500, or when power is turned on/off for each device. Second one is called "logical termination" to be used when a device is logically installed into or isolated from the system.

In the physical termination, although a number of a bus controller cannot be changed, a required time to terminate is short (e.g., 500 ns). On the other hand, in the logical termination, although a number of a bus controller can be changed, a required time to terminate is long (e.g., 50 ms).

Figure 3:
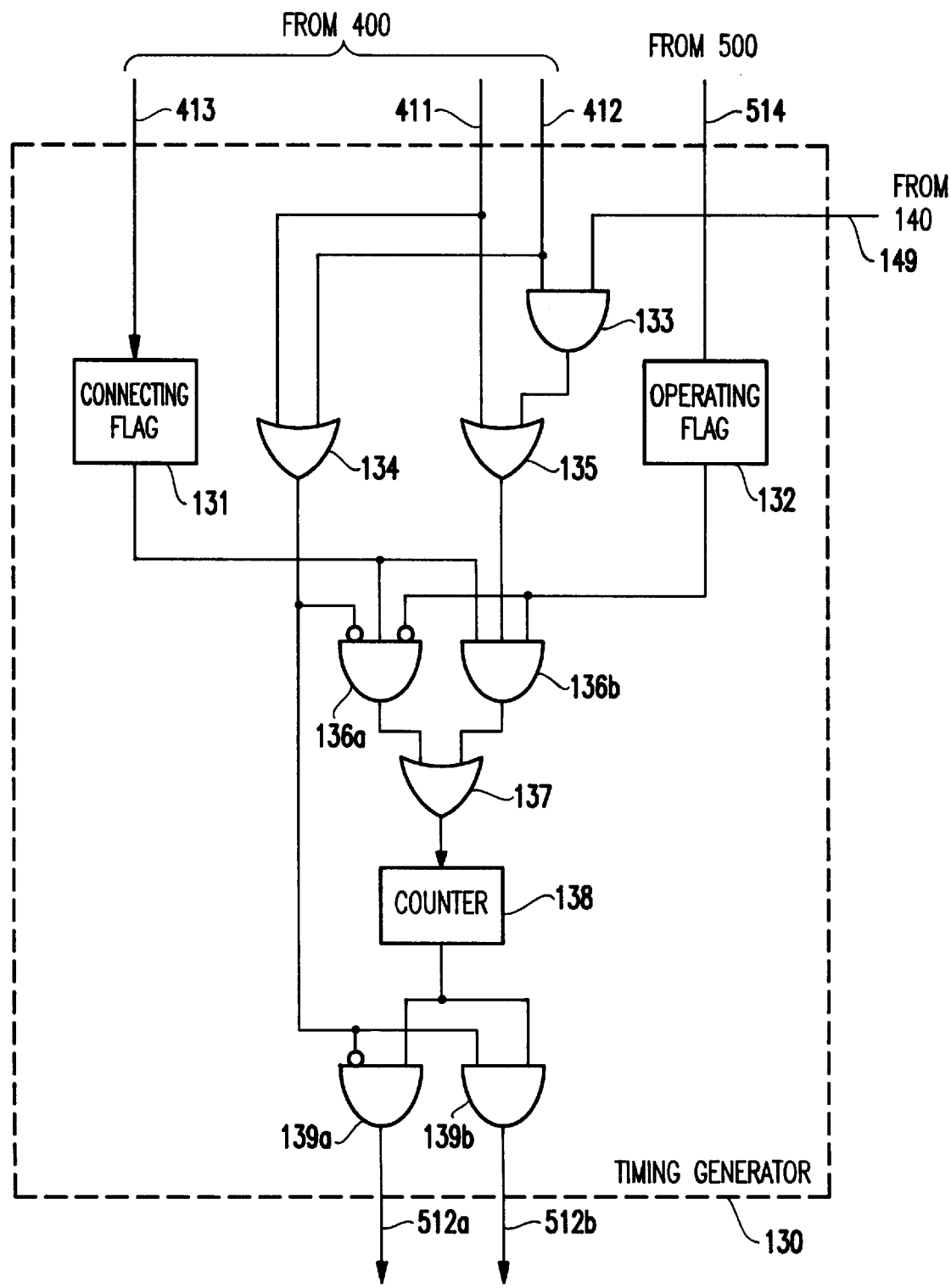
FIG. 3 is a block diagram showing the configuration of a timing generator 130 in the bus controller.

Referring to FIG. 3, the timing generator 130 has an input 410 including a physical termination signal 411, a logical termination signal 412, and a connecting state signal 413. The timing generator 130 also has the status information 514 from the system bus and an empty signal 149 from the bus control table 140.

The timing generator 130 has a connection flag 131 and an operation flag 132. The connection flag 131 indicates whether a corresponding device is connected to the system bus 500 (e.g., "1" indicates "connected"). The connection flag 131 is set by the connecting state signal 413. The operation flag 132 indicates whether the system bus 500 is operating (e.g., "1" indicates "operating"). The operation flag 132 is set by the status information 514.

The timing generator 130 also has gates 133, 134, 135, 136a, 136b, 137, 139a, and 139b. The AND gate 133 performs logical AND operation between the signal 514 and 149. Thereby, the status information signal 514 is masked if the bus control table 140 is not empty. The OR gate 134 performs logical OR operation between the physical termination signal 411 and the logical termination signal 412. The OR gate 135 performs logical OR operation between the physical termination signal 411 and an output of the AND gate 133.

The AND gate 136a performs logical AND operation among a reverse of an output of the gate 134, a reverse of the operating flag 132, and the connecting flag 131. The AND gate 136b performs logical AND operation among the output of the gate 135, the operating flag 132, and the connecting flag 131. The AND gate 136a indicates count down for bus restart. The AND gate 136b indicates count down for bus termination. The OR gate 137 performs logical OR operation between the AND gates 136a and 136b.

The timing generator 130 also has a counter 138 for counting clocks to generate timings. The counter 138 has an initial value (e.g., "10 clocks") which is determined based on a time difference for transferring the bus termination signal between the diagnostic unit 300 and the bus controllers 100. The counter 138 is triggered by an output of the OR gate 137. The counter 138 outputs a completion signal when a value reaches a predetermined value (e.g., "0"). The AND gates 139a and 139b mask the completion signal according to the output of the OR gate 134. The signal line 512 includes an output signal 512a from the AND gate 139a indicating a bus start command, and an output signal 512b from the AND gate 139b indicating a bus termination command.

Referring to FIG. 4, the bus arbitor 160 has an arbitration pointer 161, an incrementor 162, a request register 163, an arbitration determinator 164, a device number register 165, and a comparator 166.

The arbitration pointer 161 stores a device number of a device which has the highest priority. The arbitration pointer 161 is reset by the arbitration pointer clear signal 159 from the bus operation controller 150. The request register 163 stores requests from the system bus 500. The arbitration determinator 164 arbitrates requests stored in the request register 163 and selects one request according to the arbitration pointer 161.

The device number register 165 stores a device number of a device which is connected to that bus controller 100. The comparator 166 detects whether the selected request belongs to the device which is connected to that bus controller 100. The output of the comparator 166 is sent to the request controller 170 as the signal 169.

The incrementor 162 increments a device number selected by the arbitration determinator 164. Therefore, the highest priority is maintained dynamically (e.g., round robin).

Referring to FIG. 5, the bus control table 140 has a plurality of entries corresponding to all requests on the system bus 500. Each entry has a valid field 141, a request field 142, an address field 143, and an owner flag 144. The valid field 141 indicates whether the entry is valid. The request field 142 indicates a type of request (e.g., a read request, an invalidation request, a read-and-invalidation request, etc). The address field 143 indicates a destination address of the request. The owner field 144 indicates whether the request belongs to that bus controller ("owner") or to another bus controller ("other"). Each entry of the bus control table 140 is registered upon a request, and is cleared upon completion (e.g., reply) of the request. If there is no registered entry, it indicates that there is no incomplete request.

Figure 6:
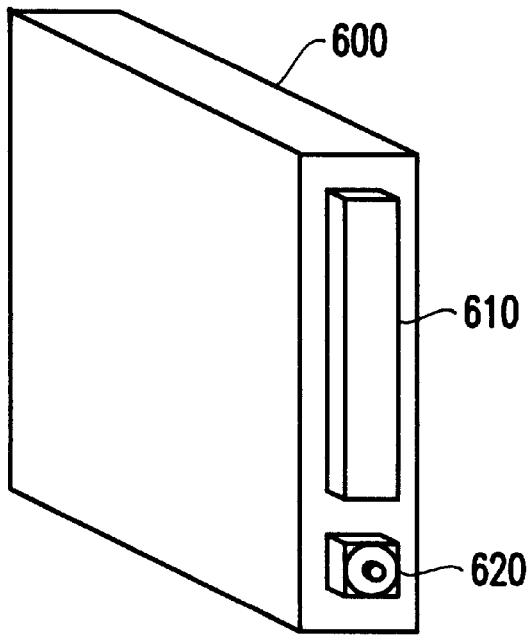
FIG. 6 shows the outlook of a device for connecting to the bus.

Referring to FIG. 6, an outlook of a board 600 which includes a device 200 and a bus controller 100 is shown. The board 600 has a connector 610 for connecting to the system bus 500 and a switch 620. The switch 620 is closed (short circuited) when the board 600 is connecting to the system bus 500. The switch 620 is opened (open circuited) when the board 600 is not connecting to the system bus 500.

If a state of the switch 620 is changed, the connection detector 120 (FIG. 2) detects the change (e.g., insertion or disconnection). During the change, noise may appear on the system bus 500. The connection detector 120 also detects that the noise has disappeared. The latter detection may be realized by counting a predetermined time based on a measurement result by an insertion/disconnection test.

Hereinbelow and referring to FIGS. 1–11, the operation of the bus controller in accordance with the above-mentioned embodiment of the present invention will be described.

Figure 7:
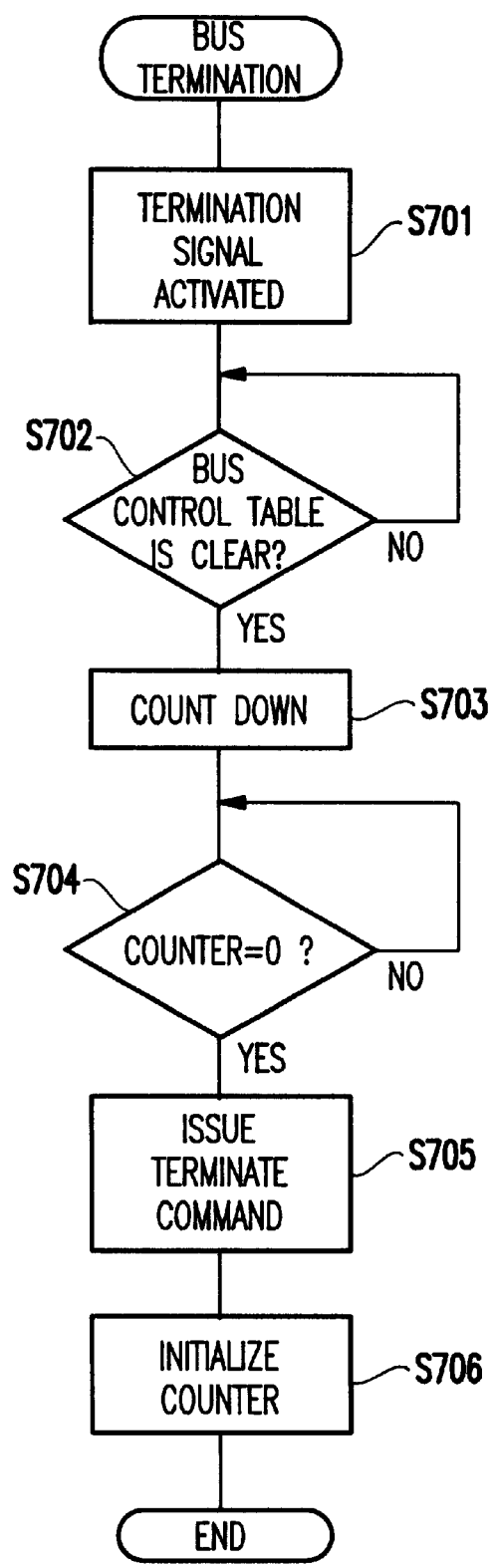
FIG. 7 is the flow-chart showing operations of bus termination.
Figure 8:
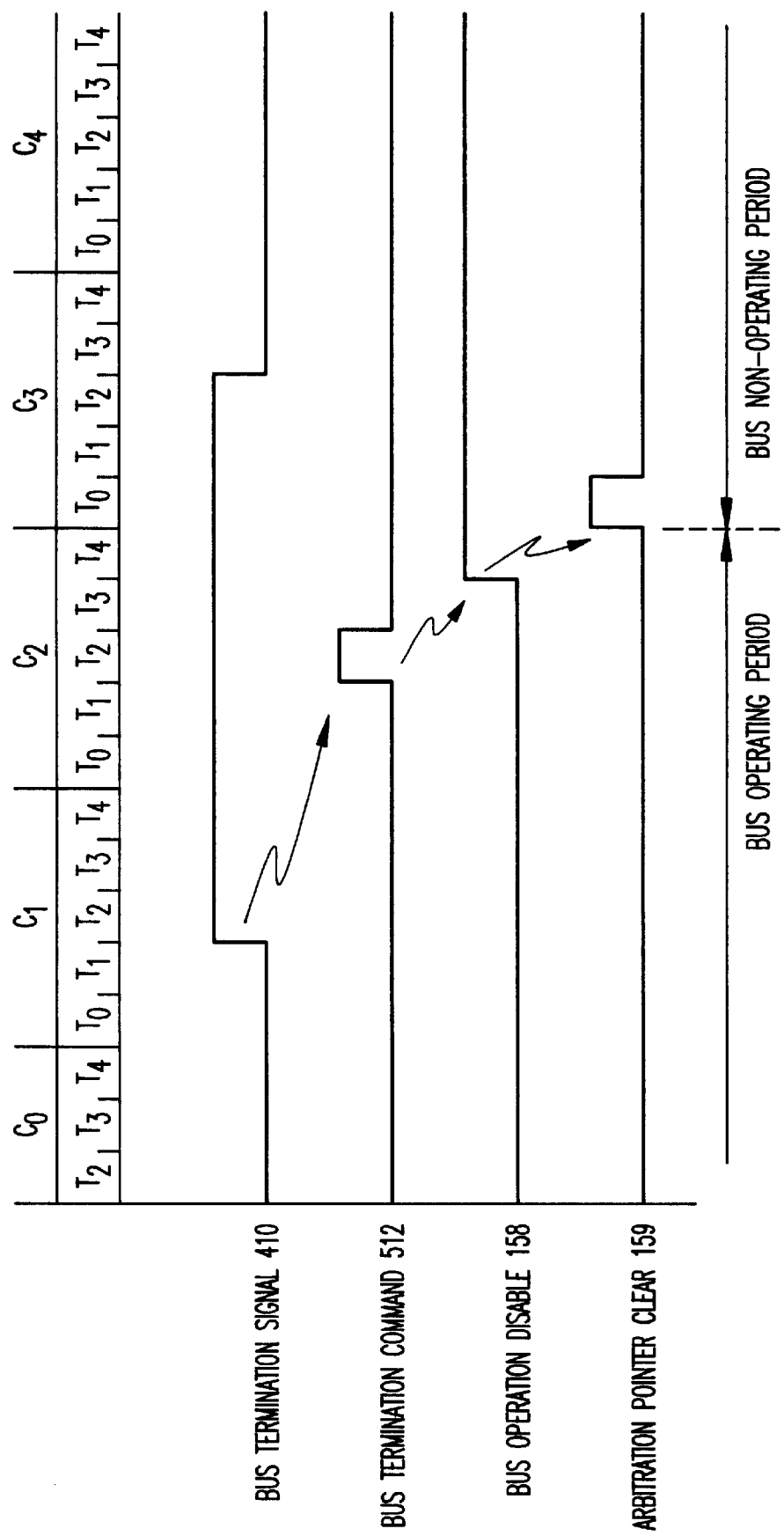
FIG. 8 is the timing-chart showing operations of physical bus termination.
Figure 9:
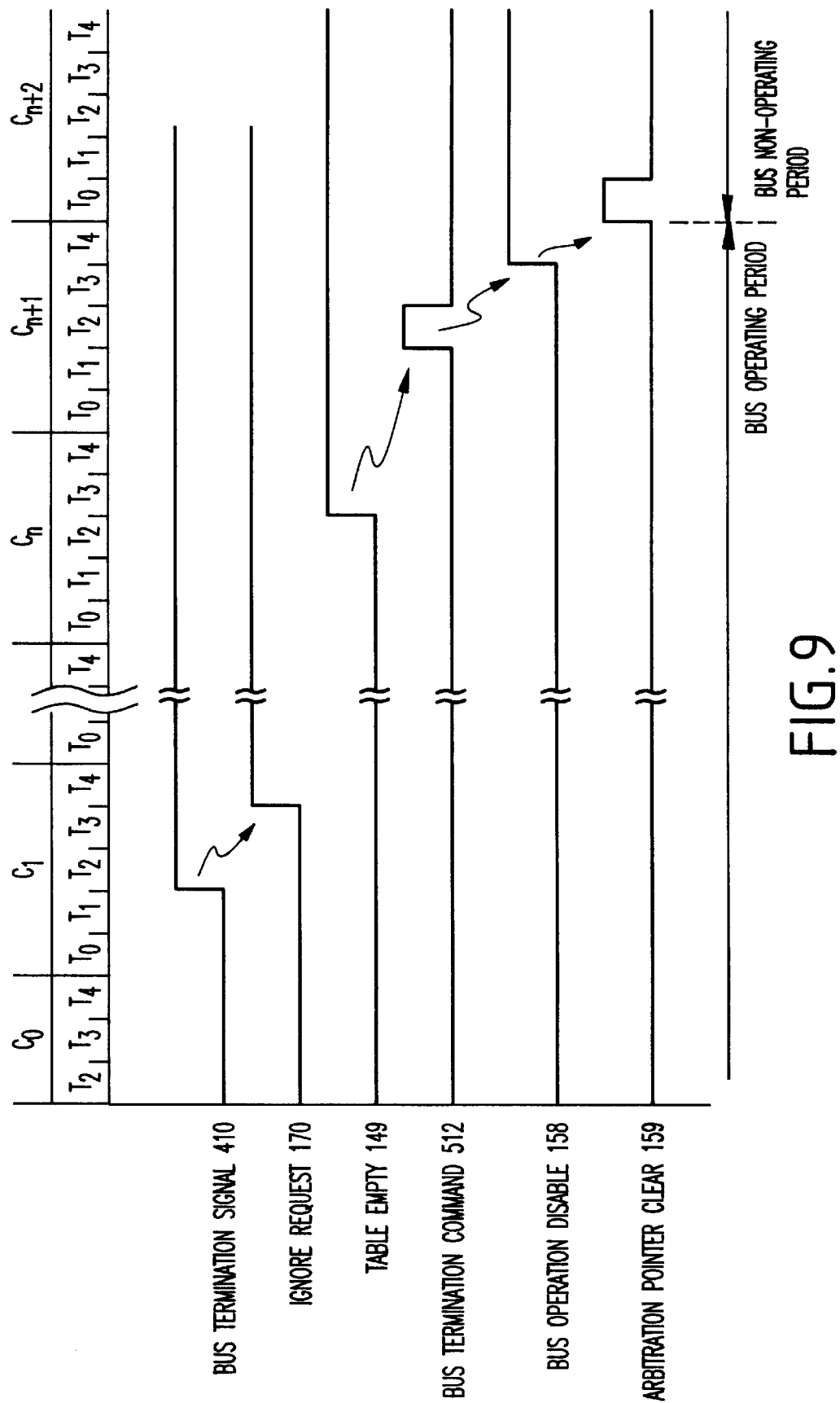
FIG. 9 is the timing-chart showing operations of logical bus termination.

FIG. 7 shows both the physical and logical termination (step S702 is dedicated to the logical termination). FIG. 8 shows the physical termination. FIG. 9 shows the logical termination.

Referring to FIG. 7–9, if the bus termination signal 410 is activated (S701, $C_1:T_2$), then a bus termination operation starts. If the termination is a logical termination, the request controller 170 does not accept new requests ($C_1:T_4$ in FIG. 9), and the timing generator 130 waits until the bus control table 140 becomes empty (S702, $C_n:T_3$ in FIG. 9).

After that, the counter 138 in the timing generator 130 starts counting down (S703). If the value of the counter 138 becomes a predetermined value (e.g., "0"), the timing generator 130 issues the bus termination command to the system bus 500 (S705, $C_2:T_2$ in FIG. 8, $C_{n+}:T_2$ in FIG. 9).

By the bus termination command, the operation of the system bus 500 is disabled ($C_2:T_4$ in FIG. 8, $C_{n+1}:T_4$ in FIG.

9). The operating flag 132 is reset to indicate "non-operating state". The bus operation controller 150 sends the arbitration pointer clear signal 159 to the bus arbitor 160 ($C_3:T_0$ in FIG. 8, $C_{n+2}:T_0$ in FIG. 9). The counter 138 is set to an initial value (S706).

Figure 10:
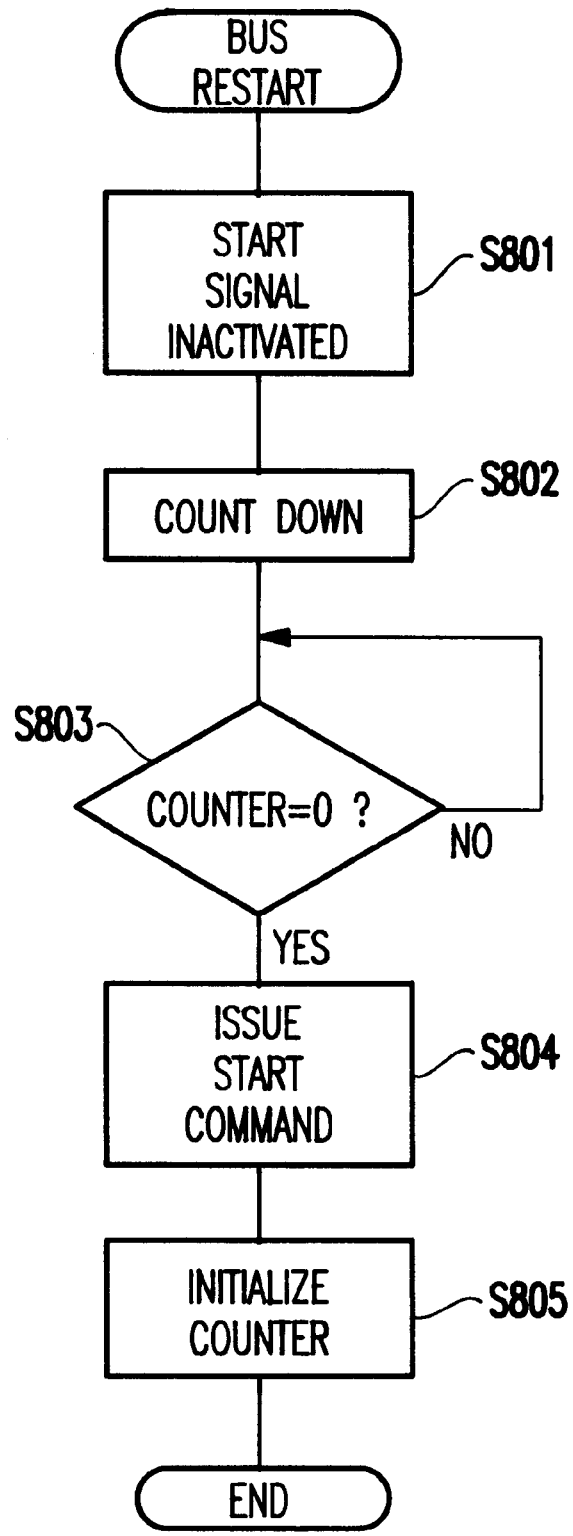
FIG.10 is the flow-chart showing operations of bus restart.
Figure 11:
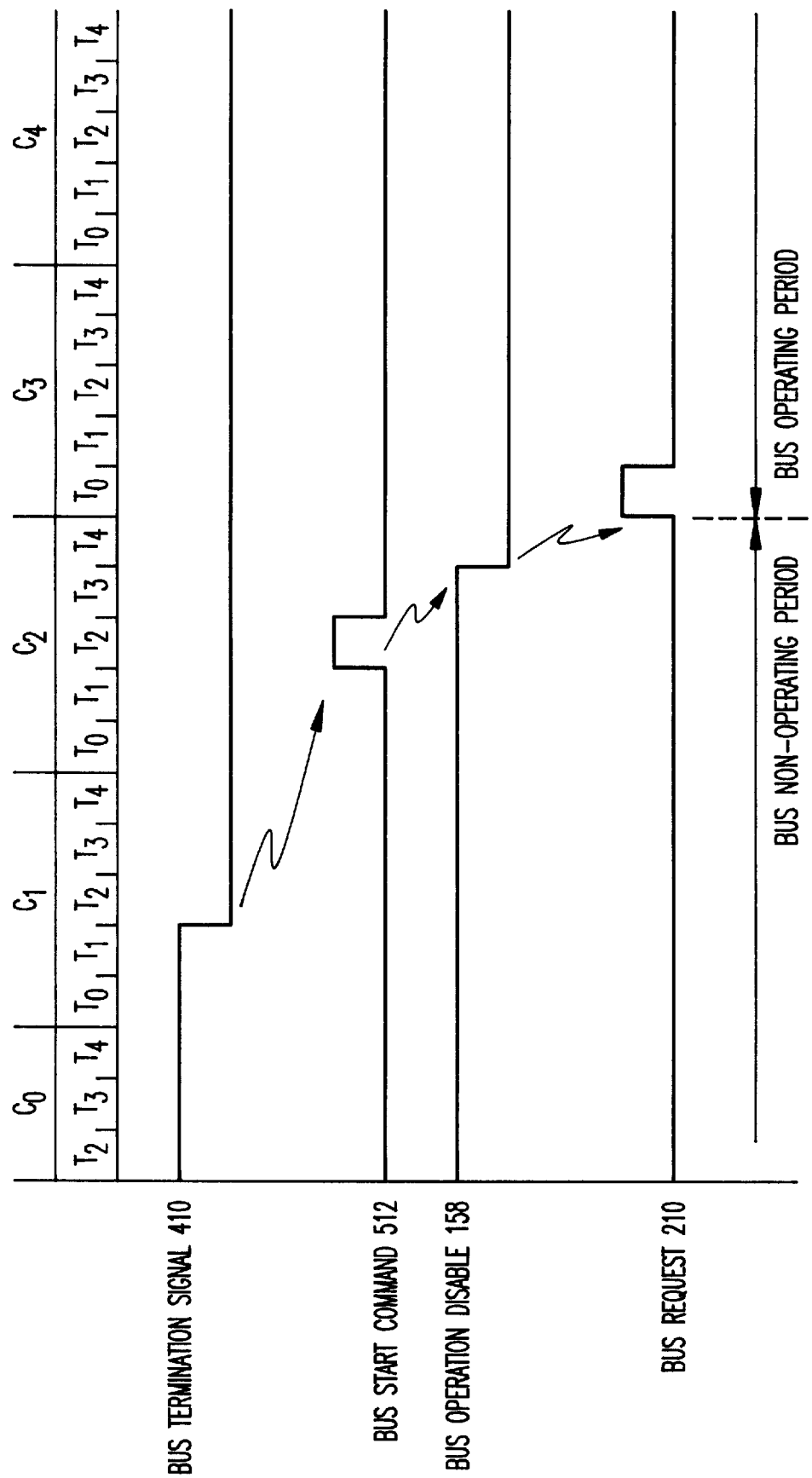
FIG. 11 is the timing-chart showing operations of bus restart.

Referring to FIG. 10–11, if the bus termination signal 410 is inactivated (S801, $C_1:T_2$), then a bus restart operation starts. The counter 138 in the timing generator 130 starts counting down (S802). If the value of the counter 138 becomes a predetermined value (e.g., "0"), the timing generator 130 issues the bus start command to the system bus 500 (S804, $C_2:T_2$).

By the bus start command, the operation of the system bus 500 is enabled ($C_2:T_4$). The operating flag 132 is set to indicate "operating state". The bus operation controller 150 sends the arbitration pointer clear signal 159 to the bus arbitor 160 ($C_3:T_0$). The counter 138 is set to an initial value (S805).

As is apparent from the above description, according to the present invention, since the timing generator 130 generates the timing for issuing bus termination/start command, receiving improper data is avoided. Moreover, since the bus operation controller 150 clears the arbitration pointer 161, the arbitration pointers 161 are controlled to be consistent with each other. Furthermore, since the timing generator 130 waits until the bus control table 140 becomes empty, correspondence between the requests and the replies is kept. Thus, a live-line insertion and disconnection on a synchronous bus is realized.

While the invention has been described in terms of a preferred embodiment, those skilled in the art will recognize that the invention can be practiced with modification within the spirit and scope of the appended claims.

What is claimed is:

1. A bus controller for connecting to a bus in a computer system, comprising:
   a timing generator for generating a timing of a bus termination command and a bus start command to be issued to the bus;
   a bus operation controller for controlling an operation of the bus based on one of the bus termination command and the bus start command issued by said timing generator;
   a bus control table for managing correspondence between requests and replies on the bus,
   wherein said timing generator delays issuing the bus termination command until said bus control table becomes empty, said bus control table having entries each of which corresponds to a pair of a request and a reply, each of said entries comprises:
   a valid field for indicating whether the entry has a valid pair;
   a request field for indicating a type of the request;
   an address field for indicating a destination address of the request; and
   an owner field for indicating whether the request belongs to the bus controller or to another bus controller in said computer system.

2. A bus controller for connecting to a bus in a computer system, comprising:
   a timing generator for generating a timing of a bus termination command and a bus start command to be issued to the bus;
   a bus operation controller for controlling an operation of the bus based on one of the bus termination command and the bus start command issued by said timing generator; and
   a bus arbiter for arbitrating requests for the bus, said bus arbiter including:
   an arbitration pointer for identifying a highest priority device in the computer system, wherein said bus operation controller clears said arbitration pointer when the bus is terminated;
   an arbitration determinator for selecting one request for the bus according to said arbitration pointer, and for outputting a first identification number of a device which issues the selected request;
   a device number register for storing a second identification number of a device to which the bus controller is connected; and
   a comparator for comparing the first identification number with the second identification number.

3. The bus controller according to claim 2, further comprising:
   a request controller for controlling requests and replies with the bus, said request controller accepts requests and replies when the system bus is not disabled by said bus operation controller and said comparator detects coincidence between the first identification number and the second identification number.

4. A computer system having a diagnostic unit and at least one pair of a bus controller and a device, said bus controller connecting to a system bus and a diagnostic bus, said diagnostic unit connecting to the diagnostic bus, said bus controller comprising:
   a timing generator for generating a timing of a bus termination command and a bus start command to be issued to the system bus; and
   a bus operation controller for controlling an operation of the system bus based on one of the bus termination command and the bus start command issued by said timing generator,
   wherein said bus controller further comprises a bus arbiter for arbitrating requests for the system bus, said bus arbiter including:
   an arbitration pointer for identifying a highest priority device in the computer system, wherein said bus operation controller clears said arbitration pointer when the system bus is terminated;
   an arbitration determinator for selecting one request for the system bus according to said arbitration pointer, and for outputting a first identification number of a device which issues the selected request;
   a device number register for storing a second identification number of a device to which the bus controller is connected; and
   a comparator for comparing the first identification number with the second identification number.

5. The computer system according to claim 4, said bus controller further comprising:
   a request controller for controlling requests and replies with the system bus, said request controller accepts requests and replies when the system bus is not disabled by said bus operation controller and said comparator detects coincidence between the first identification number and the second identification number.

* * * * *